US008538054B2

(12) United States Patent
Cooper et al.

(10) Patent No.: US 8,538,054 B2
(45) Date of Patent: Sep. 17, 2013

(54) PHANTOM POWER CONTROLLED SWITCH

(75) Inventors: Steven R. Cooper, Round Lake Beach, IL (US); Benjamin H. Morales, Chicago, IL (US); Jordan D. McCormick, Wheeling, IL (US)

(73) Assignee: Switchcraft, Inc., Chicago, IL (US)

( * ) Notice: Subject to any disclaimer, the term of this patent is extended or adjusted under 35 U.S.C. 154(b) by 634 days.

(21) Appl. No.: 12/783,094

(22) Filed: May 19, 2010

(65) Prior Publication Data

US 2011/0286612 A1 Nov. 24, 2011

(51) Int. Cl.
*H04R 25/00* (2006.01)
*H04B 3/00* (2006.01)

(52) U.S. Cl.
USPC ............................................ 381/323; 381/81

(58) Field of Classification Search
USPC ................. 381/109, 111, 113, 122, 375, 323; 360/31
See application file for complete search history.

(56) References Cited

U.S. PATENT DOCUMENTS

| | | | | |
|---|---|---|---|---|
| 4,270,151 | A * | 5/1981 | Steinmaier | 360/31 |
| 4,567,608 | A | 1/1986 | Watson | |
| 4,737,735 | A | 4/1988 | Kampes | |
| 6,020,788 | A | 2/2000 | Comeau | |
| 6,160,450 | A | 12/2000 | Eschauzier et al. | |
| 6,541,878 | B1 | 4/2003 | Diab | |
| 7,046,815 | B2 * | 5/2006 | Akino et al. | 381/122 |
| 7,542,578 | B2 * | 6/2009 | Akino | 381/113 |
| 7,620,189 | B2 | 11/2009 | Lang | |
| 2002/0186855 | A1 * | 12/2002 | Akino et al. | 381/111 |
| 2011/0182442 | A1 * | 7/2011 | McDonald et al. | 381/109 |

* cited by examiner

*Primary Examiner* — Fan Tsang
*Assistant Examiner* — Eugene Zhao
(74) *Attorney, Agent, or Firm* — Schiff Hardin LLP

(57) ABSTRACT

A switching operation is performed in response to an externally applied DC control signal from an external load. An input connector receives an input audio signal from an external audio source, and an output connector that provides an audio output signal. A DC isolator couples the input audio signal from the input connector as the audio output signal on the output connector while isolating the externally applied DC control signal from the input connector. A switch is responsive to the externally applied DC control signal applied to the output connector so as to perform the switch operation.

26 Claims, 7 Drawing Sheets

PHANTOM POWER CONTROLLED SWITCH

TECHNICAL FIELD

The method and/or apparatus described below relates to the use of phantom power from a console, such as an audio or other console, in order to switch various devices such as a direct box or an A/B box.

BACKGROUND

A direct box is a device used to adapt an unbalanced AC audio signal to a balanced low impedance AC output for transmission to an audio console. A switch, commonly know as a "ground lift switch," is provided in the direct box to connect or disconnect separate ground points between the input and the output of the direct box. The position of the switch is manually controlled by the user at the direct box. The ideal position of the switch is dependent on the types of equipment connected at both the input and output of the direct box and related grounds.

An input selection box, commonly called an A/B box, is a device used to route one of two (or more) inputs to a single common output. A switch is provided in these units to select which input is routed to the output. The position of this switch is manually controlled by the user at the A/B box.

Phantom power is a system for applying a DC voltage across the balanced AC inputs of audio consoles. Phantom power has primarily been used to power the electronics of amplifier circuits in active direct boxes or condenser microphones. Phantom power is usually configurable to be ON or OFF by a control switch on the audio console.

The method and/or apparatus described below relates to the use of such phantom power to control a direct box, an A/B box, or other apparatus.

DETAILED DESCRIPTION

Figure 1:
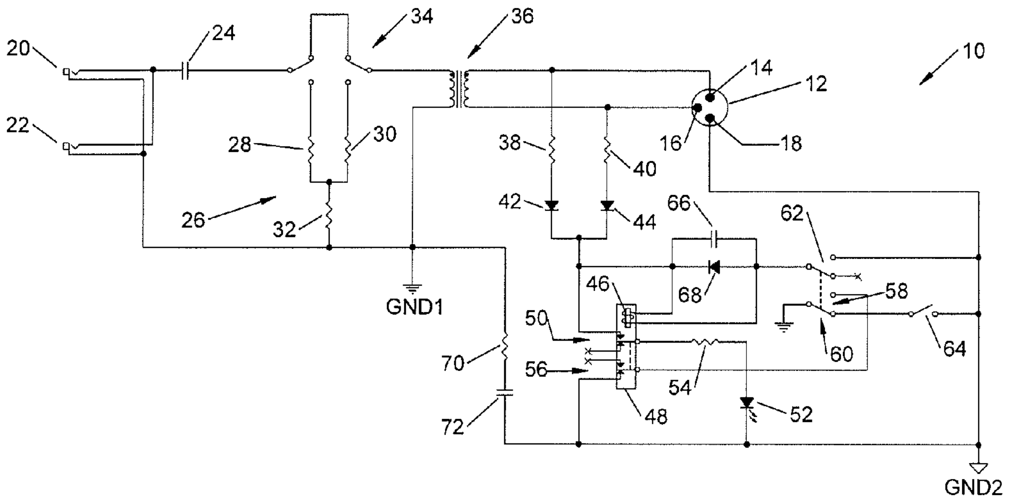
FIG. 1 illustrates a phantom power controlled direct box.

FIG. 1 shows an arrangement to facilitate opening or closing of the connection between input and output ground points in a direct box by applying or removing DC phantom power from the balanced output audio line. A phantom power controlled relay is used to connect or disconnect the separate input and output ground points. Other functions controlled by the switching mechanism are possible. The benefit of this arrangement is to allow the ground configuration to be remotely controlled from the audio console providing the DC phantom power rather than at the direct box itself.

As shown in FIG. 1, a direct box 10 includes a three conductor connector 12. The direct box 10 is referred to as a box because the components shown in FIG. 1 are contained in a housing (not shown). The connector 12 functions as both the output of a balanced AC audio signal from the direct box 10 (to, e.g., an audio console) and the input (from, e.g., the audio console) for providing phantom power to the direct box 10. A conductor 14 of the connector 12 carries the non-inverted portion of the balanced output audio signal, and a conductor 16 carries the inverted portion of the balanced output audio signal. Both of the conductors 14 and 16 function as positive DC poles for the phantom supply from an audio console. Phantom power is commonly 12, 24, or 48 volts. A conductor 18 of the connector 12 provides a return path for the phantom power back to the audio console. This return path is designated as ground GND2. The conductors 14, 16, and 18, for example, may be pins.

A two conductor connector 20 of the direct box 10 receives the unbalanced input signal. A two conductor connector 22 is connected in parallel with the connector 20 to facilitate a direct output of the unbalanced input signal provided to the connector 20. A shared ground connection of the connectors 20 and 22 is designated as a ground GND1. A decoupling capacitor 24 blocks any DC voltage present on the unbalanced input signal.

An input attenuation pad 26 comprises resistors 28, 30, and 32. The attenuation pad 26 is switched into or out of the AC input line signal path by a toggle switch 34. The attenuation pad 26 can be used to reduce the input signal to a level appropriate for a transformer 36. In the position of the toggle switch 34 as shown in FIG. 1, the toggle switch 34 removes the attenuation pad 26 from the input signal. In the alternate position of the toggle switch 34, the attenuation pad 26 is inserted into the signal path and creates a voltage divider to reduce the signal level induced across the transformer 36.

The conductor 14 of the connector 12 is connected to one end of the secondary of the transformer 36, and the conductor 16 of the connector 12 is connected to the other end of the secondary of the transformer 36.

The unbalanced AC input signal provided to the connector 20 is converted into a balanced AC output signal by the transformer 36. The transformer 36 also reduces the output impedance of the balanced signal for compatibility with the input of the audio console, allows the ground references GND1 and GND2 between the connectors 12 and 20 to be decoupled, and blocks or isolates the positive DC voltage of the phantom power on the conductors 14 and 16 of the connector 12 from the input of the direct box 10.

Resistors 38 and 40 combine the phantom power currents on the conductors 14 and 16 of the connector 12 while maintaining a load impedance on the balanced output. Diodes 42 and 44 may be included to isolate the load impedance from the resistors 38 and 40 across the balanced output when the phantom power is disengaged.

The phantom power combined by the resistors 38 and 40 is fed to an electromagnetic coil 46 of a relay 48 such as a double pole, double throw, 2-Form-C relay. A first pole 50 of the relay 48 opens or closes the connection between the phantom power feed and an LED 52. A resistor 54 limits the current through the LED 52. A second pole 56 of the relay 48 opens or closes the connection between the ground GND2 and a first pole 58 of a switch 60 such as a double pole, double throw slide switch. The switch 60 also has a second pole 62. The switch 60 is used to select whether the switching of the ground configuration is performed remotely from the audio console by the relay 48 or locally by a manually operated switch 64.

A capacitor 66 increases the voltage transition time across the coil 46 of the relay 48, delaying the operation point of the relay 48 relative to the phantom power control voltage (hysteresis). A diode 68 across the capacitor 66 prevents a large voltage spike from being created by the electromagnetic coil 46 of the relay 48 if the return path for the phantom power is broken.

A resistor 70 and a capacitor 72 form a low impedance conduction path between GND1 and GND2 above audio frequencies to minimize RF interference.

In the switch positions of FIG. 1, the first pole 58 of the switch 60 connects GND1 to the switch 64, giving control of the ground configuration to the switch 64. The switch 64, for example, may be a single pole, single throw toggle switch operated by the user at the direct box 10 to open or close the connection between GND1 and GND2. The second pole 62 of the switch 60 breaks the phantom power return path GND2, preventing the relay 48 from needlessly operating when phantom power is applied at the audio console.

In the alternate position of the switch 60, the phantom power return path to GND2 is completed through the second pole 62 of the switch 60. Also, the connection between GND1 and the switch 64 is broken by the first pole 58 the switch 60. GND1 is then routed through the first pole 58 of the switch 60 to the second pole 56 of the relay 48, giving remote control of the ground configuration to the switch position of the relay 48. Application of phantom power at the audio console is then able to operate the relay 48, opening or closing the connection between GND1 and GND2.

Thus, with no phantom power applied to the direct box 10 from the audio console, the ground GND1 is connected to the ground GND2 through the first pole 58 of the switch 60 and the second pole 56 of the relay 48. Also, the LED 52 is off.

However, when phantom power is applied to the direct box 10 from the audio console, the first pole 50 of the relay 48 makes a connection between the phantom power feed and the LED 52, turning on the LED 52. Current through the LED 52 is limited by the resistor 54. The LED 52 serves as a visual indicator to the user as to the state of the ground configuration in phantom power controlled mode. Also, the connection between the ground GND1 and the ground GND2 is broken by the second pole 56 of the relay 48.

Figure 2:
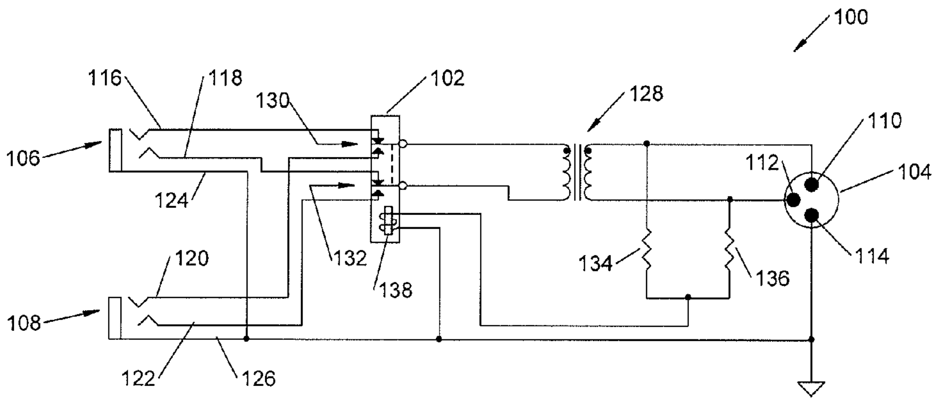
FIG. 2 illustrates a phantom power controlled A/B box.

FIG. 2 shows an arrangement to facilitate the input selection of an A/B box 100 by applying or removing DC phantom power from the balanced output audio line of the A/B box 100. The A/B box 100 is also referred to as a box because the components shown in FIG. 2 are contained in a housing (not shown). The benefit of this arrangement is to allow the input source to be remotely selected from the audio console rather than at the A/B box 100 itself. The A/B box 100 selects one of two (or more) AC inputs which is then routed to the one AC balanced output of the A/B box 100. The selection is controlled by application of external phantom power on the balanced output of the A/B box 100.

The A/B box 100 of FIG. 2 includes a relay 102, such as a double pole, double throw, 2-Form-C relay, that is used to connect an output connector 104 to either of two input connectors 106 or 108, depending on whether phantom power is applied. Other functions controlled by the switching mechanism are possible but not shown.

The connector 104 is a three conductor connector, functioning as both the output of the balanced AC audio signal and the input for the phantom power. A conductor 110 of the connector 104 carries the non-inverted portion of the balanced output audio signal, and a conductor 112 carries the inverted portion of the balanced output audio signal. Both of the conductors 110 and 112 of the connector 104 function as positive DC poles for the phantom supply. As before, phantom power is commonly 12, 24, or 48 volts. A conductor 114 of the connector 104 provides a return path for the phantom power back to the audio console. The conductors 110, 112, and 114, for example, may be pins.

Both of the connectors 106 and 108 are three conductor connectors functioning as inputs to the A/B box 100. Conductors 116 and 118 of the connector 106 carry the AC input signal from a first audio source. Conductors 120 and 122 of the connector 108 carry the AC input signal from a second audio source. Conductors 124 and 126 of the connectors 106 and 108 serves as a common ground connection.

The conductors 116 and 118 of the connector 106 and the conductors 120 and 122 of the connector 108 are connected to a transformer 128 through switch contacts of the relay 102. The conductor 110 of the connector 104 is connected to one end of the secondary of the transformer 128, and the conductor 112 of the connector 104 is connected to the other end of the secondary of the transformer 128.

A first pole 130 of the relay 102 connects either the conductor 116 of the connector 106 or the conductor 120 of the connector 108 to the one end of the primary winding of the transformer 128. A second pole 132 of the relay 102 connects either the conductor 118 of the connector 106 or the conductor 122 of the connector 108 to the other end of the primary winding of the transformer 128. The transformer 128 blocks the positive DC voltage on the phantom power on the conductors 110 and 112 of the connector 104 from the first and second sources connected to the connectors 106 and 108, while allowing the AC components of the audio signal from the connectors 106 and 108 to pass through to the connector 104.

Resistors 134 and 136 combine the phantom power currents on the conductors 110 and 112 of the connector 104 while maintaining a load impedance on the balanced output of the A/B box 100. The phantom power combined by the resistors 134 and 136 is fed to an electromagnetic coil 138 of the relay 102.

When phantom power is applied to the connector 104 and then through the combining resistors 134 and 136 to the relay 102, the coil 138 is energized and the first and second poles 130 and 132 of the relay 102 switch to connect only the conductors 120 and 122 of the connector 108 across the primary of the transformer 128. When the phantom power is off, the relay 102 is de-energized and only the conductors 116 and 118 of the connector 106 are connected across the primary winding of the transformer 128 through the first and second poles 130 and 132 of the relay 102. Accordingly, application of phantom power from the audio console to the connector 104 operates the relay 102 through the combining resistors 134 and 136 so as to switch the primary connections of the transformer 128 between the connectors 106 and 108.

Figure 3:
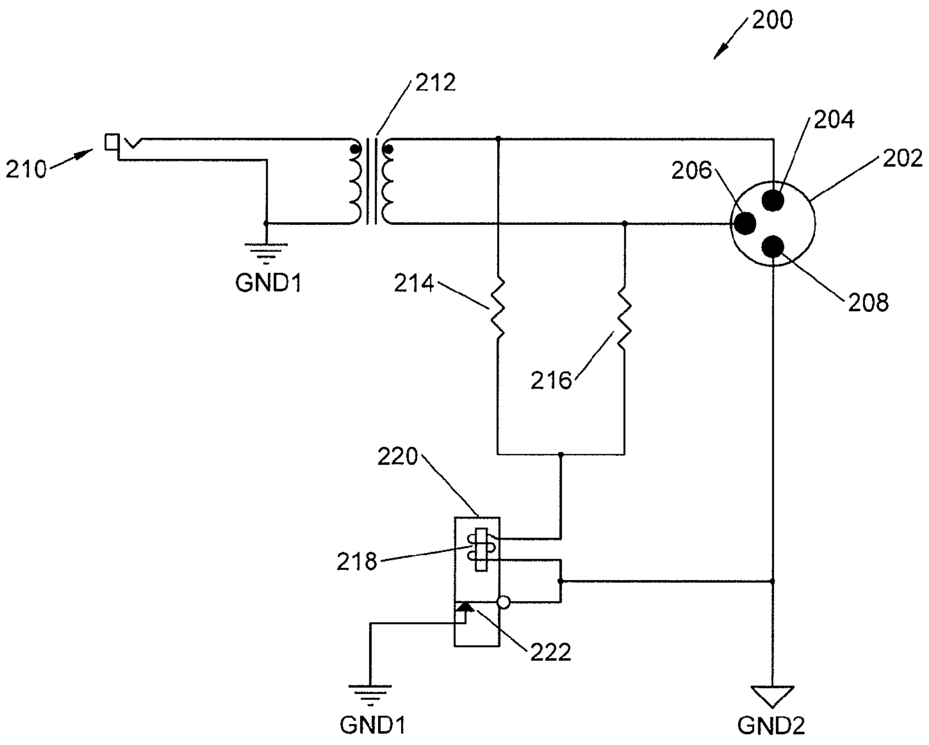
FIG. 3 illustrates an exemplary variation of FIG. 1.

Variations on the use of phantom power can be made without departing from the scope of the invention as defined by the claims below. For example, one such variation is shown in FIG. 3 by way of a direct box 200.

The direct box 200 includes a three conductor connector 202. The connector 202 functions as both the output of a balanced AC audio signal from the direct box 200 and the input for phantom power to the direct box 200. A conductor 204 of the connector 202 carries the non-inverted portion of the balanced output audio signal, and a conductor 206 carries the inverted portion of the balanced output audio signal. Both of the conductors 204 and 206 function as positive DC poles for the phantom supply from an audio console. A conductor 208 of the connector 202 provides a return path for the phantom power back to the audio console. This return path is designated as ground GND2. The conductors 204, 206, and 208, for example, may be pins.

A two conductor connector 210 of the direct box 200 receives the unbalanced input signal. A ground connection of the connector 210 is the ground GND1. The unbalanced AC input signal provided to the connector 210 is converted into a balanced AC output signal by a transformer 212. The transformer 212 also reduces the output impedance of the balanced signal for compatibility with the input of the audio console, allows the ground references between the connectors 202 and 210 to be decoupled, and blocks the positive DC voltage of the phantom power on the conductors 204 and 206 of the connector 202 from the input of the direct box 200. The conductor 204 of the connector 202 is connected to one end of the secondary of the transformer 212, and the conductor 206 of the connector 202 is connected to the other end of the secondary of the transformer 212.

Resistors 214 and 216 combine the phantom power currents on the conductors 204 and 206 of the connector 202 while maintaining a load impedance on the balanced output. The phantom power combined by the resistors 214 and 216 is fed to an electromagnetic coil 218 of a relay 220. A pole 222 of the relay 220 opens or closes the connection between the ground GND2 and the ground GND1. The ground GND1 provides a return for both the connector 210 and the primary of the transformer 212.

When no phantom power is applied to the direct box 200 from the audio console, the pole 222 of the relay 220 connects the grounds GND1 and GND2. When phantom power is applied to the direct box 200 from the audio console, the phantom power is combined by the resistors 214 and 216, and the combined phantom power energizes the coil 218 to open the pole 222 and break the connection between the grounds GND1 and GND2.

Figure 4:
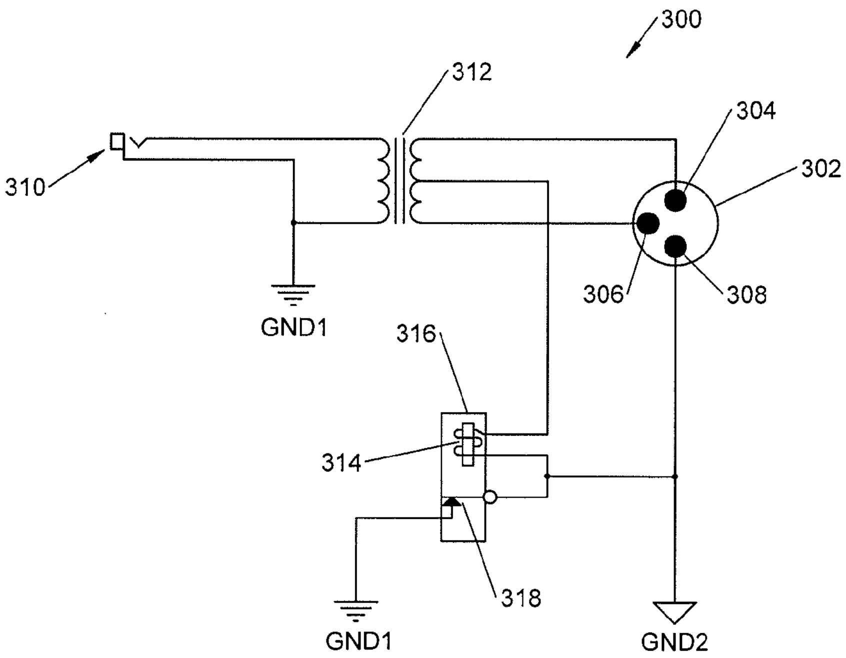
FIG. 4 illustrates another exemplary variation of FIG. 1.

FIG. 4 is another variation. As shown in FIG. 4, a direct box 300 includes a three conductor connector 302. The connector 302 functions as both the output of a balanced AC audio signal from the direct box 300 and the input for phantom power to the direct box 300. A conductor 304 of the connector 302 carries the non-inverted portion of the balanced output audio signal, and a conductor 306 carries the inverted portion of the balanced output audio signal. Both of the conductors 304 and 306 function as positive DC poles for the phantom supply from an audio console. A conductor 308 of the connector 302 provides a return path for the phantom power back to the audio console. This return path is the ground GND2. The conductors 304, 306, and 308, for example, may be pins.

A two conductor connector 310 of the direct box 300 receives the unbalanced input signal and applies the unbalanced input signal across the primary of a center tap transformer 312. The ground GND1 serves as a ground connection for the connector 310 and the primary of the transformer 312. The unbalanced AC input signal provided to the connector 310 is converted into a balanced AC output signal by the transformer 312. The transformer 312 also reduces the output impedance of the balanced signal for compatibility with the input of the audio console, allows the ground references between the connectors 302 and 310 to be decoupled, and blocks the positive DC voltage of the phantom power on the conductors 304 and 306 of the connector 302 from the input of the direct box 300.

The conductor 304 of the connector 302 is connected to one end of the secondary of the transformer 312, and the conductor 306 of the connector 302 is connected to the other end of the secondary of the transformer 312.

The phantom power from the audio console is fed by the center tap on the secondary of the transformer 312 to an electromagnetic coil 314 of a relay 316. A pole 318 of the relay 316 opens or closes the connection between the ground GND2 and a ground GND1. The ground GND1 provides a return for both the connector 310 and the primary of the transformer 312.

When no phantom power is applied to the conductors 304 and 306 of the connector 302 of the direct box 300 from the audio console, the pole 318 of the relay 316 connects the grounds GND1 and GND2. When phantom power is applied to the conductors 304 and 306 of the connector 302 of the direct box 300 from the audio console, the phantom power is fed by the center tap of the secondary of the transformer 312 to energize the coil 314 to open the pole 318 and break the connection between the grounds GND1 and GND2.

The center tap transformer 312 isolates the phantom power from the connector 310 and combines the two DC components of phantom power from pins 304 and 306 of the connector 302. This manner of isolation can be used in the other embodiments described herein.

FIGS. 5A, 5B, 5C, and 5D illustrate various solid state switches that may be used in place of the relays that are used in direct boxes. Thus, for example, FIGS. 5A, 5B, 5C, and 5D illustrate various solid state switches that may be used in place of the relays 48 and 220, and 316 of FIGS. 1, 3, and 4.

Figure 5:
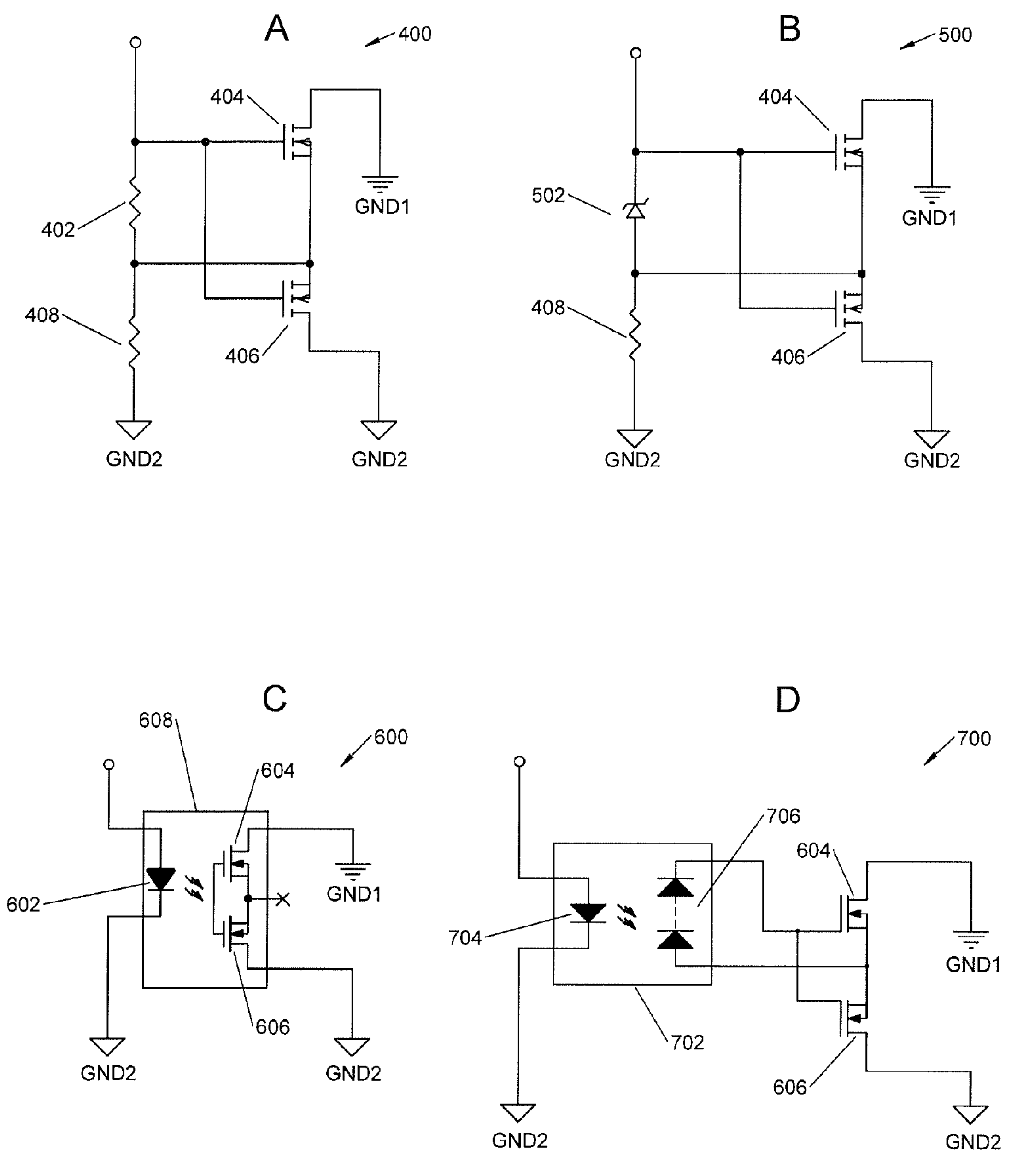
FIGS. 5A, 5B, 5C, and 5D illustrate various solid state switches that may be used in place of the relay of FIG. 1.

As shown in FIG. 5A, a solid state switch 400 includes a resistor 402 having a first end connected to receive the phantom power and a second end connected to a first end of a resistor 408. For example, the first end of the resistor 402 may be connected to the output of the combiner or to a center tap of the transformer.

The solid state switch 400 also includes a pair of n-channel enhancement mode MOSFETs 404 and 406. The drain of the MOSFET 404 is connected to the ground GND1, and the drain of the MOSFET 406 is connected to the ground GND2. The sources of the MOSFETs 404 and 406 are connected together and to the second end of the resistor 402. The gates of the MOSFETs 404 and 406 are connected together and to the first end of the resistor 402. The second end of the resistor 408 is connected to the ground GND2.

FIG. 5B shows a solid state switch 500 that is similar to the solid state switch 400 and, therefore, the same reference numerals are used to depict similar elements. In the case of the solid state switch 500, a Zener diode 502 is used in place of the resistor 402. Otherwise, the elements and connections are the same. The cathode of the Zener diode 502 is connected to receive the phantom power, and the anode of the Zener diode 502 is connected to a first end of the resistor 408.

As shown in FIG. 5C, a solid state switch 600 includes a solid state relay integrated circuit 608. The solid state relay integrated circuit 608 includes an LED 602, two n-channel depletion mode MOSFETs 604 and 606, and internal circuitry to drive the gates of MOSFETs 604 and 606. The anode of the LED 602 is connected to receive the phantom power, and the cathode of the LED 602 is connected to the ground GND2. The drain of the MOSFET 604 is connected to the ground GND1, and the drain of the MOSFET 606 is connected to the ground GND2.

FIG. 5D shows a solid state switch 700 that is similar to the solid state switch 600 and, therefore, the same reference numerals are used to depict similar elements. In the case of the solid state switch 700, a photovoltaic MOSFET driver 702 is used to drive the gates of MOSFETs 604 and 606. The photovoltaic MOSFET driver 702 includes an LED 704 and one or more photo-sensitive diodes 706. If more than one photo-sensitive diodes is used, they are connected in series. The anode of the LED 704 is connected to receive the phantom power, and the cathode of the LED 704 is connected to the ground GND2. A cathode of the photo-sensitive diodes 706 is connected to the gates of the MOSFETs 604 and 606, and an anode of the photo-sensitive diodes 706 is connected to the sources of the MOSFETs 604 and 606.

Figure 6:
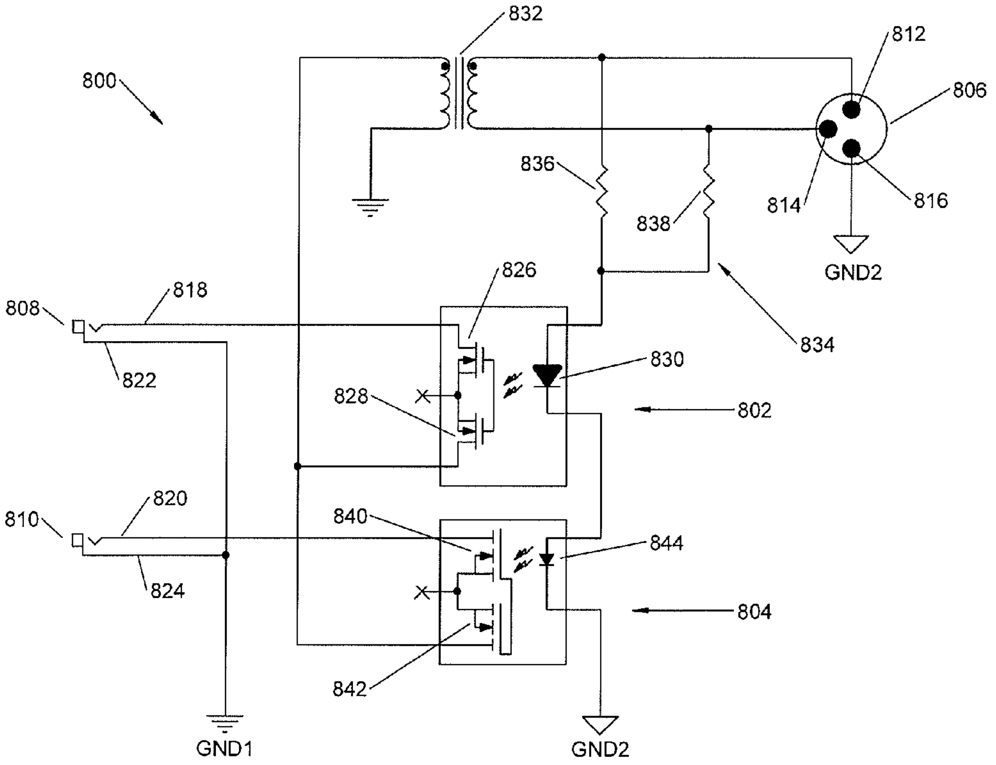
FIG. 6 illustrates a solid state version of the phantom power controlled A/B box of FIG. 2.

FIG. 6 is an example of the use of solid state relays in connection with an A/B box 800. The A/B box 800 includes phantom power controlled semiconductor relays 802 and 804 that are used to connect an output connector 806 to either of two input connectors 808 or 810, depending on whether phantom power is applied. Other functions controlled by the switching mechanism are possible but not shown.

The connector 806 is a three conductor connector, functioning as both the output of the balanced AC audio signal and the input for the phantom power. A conductor 812 of the connector 806 carries the non-inverted portion of the balanced output audio signal, and a conductor 814 carries the inverted portion of the balanced output audio signal. Both of the conductors 812 and 814 of the connector 806 function as positive DC poles for the phantom supply. A conductor 816 of the connector 806 provides a return path for the phantom power back to the audio console. The conductor 812 of the connector 806 is connected to one end of the secondary of the transformer 832, and the conductor 814 of the connector 806 is connected to the other end of the secondary of the transformer 832. The conductors 812, 814, and 816, for example, may be pins.

Both of the connectors 808 and 810 are two conductor connectors functioning as inputs to the A/B box 800. A conductor 818 of the connector 808 carries the AC input signal from a first audio source. A conductor 820 of the connector 810 carries the AC input signal from a second audio source. Conductors 822 and 824 of the connectors 808 and 810 serve as a common connection to the ground GND1.

The semiconductor relay 802 includes a pair of n-channel depletion-mode MOSFETs 826 and 828, an LED 830, and internal circuitry to drive the gates of the MOSFETs 826 and 828. The drain of the MOSFET 826 is connected to the conductor 818 of the connector 808, and the drain of the MOSFET 828 is connected to one end of the primary of a transformer 832. The other end of the primary of a transformer 832 is connected to the ground GND1. The sources of the MOSFETs 826 and 828 are connected together, and the gates of the MOSFETs 826 and 828 are connected together.

A combiner 834 combines the phantom power. The combiner includes a resistor 836 having a first end connected to the conductor 812 of the connector 806 and a resistor 838 having a first end connected to the conductor 814 of the connector 806. The second ends of the resistors 836 and 838 are connected together and to the anode of the LED 830. Thus, the anode of the LED 830 receives the combined phantom power.

The semiconductor relay 804 includes a pair of n-channel enhancement mode MOSFETs 840 and 842, an LED 844, and internal circuitry to drive the gates of MOSFETS 840 and 842. The drain of the MOSFET 840 is connected to the conductor 820 of the connector 810, and the drain of the MOSFET 842 is connected to the one end of the primary of the transformer 832. The sources of the MOSFETs 840 and 842 are connected together, and the gates of the MOSFETs 840 and 842 are connected together.

The cathode of the LED 830 is connected to the anode of the LED 844, and the cathode of the LED 844 is connected to the ground GND2.

Absence of phantom power from the audio console to the connector 806 operates the semiconductor relays 802 and 804 to connect the connector 808 to the primary of the transformer 832, and application of phantom power from the audio console to the connector 806 operates the semiconductor relays 802 and 804 to connect the connector 810 to the primary of the transformer 832.

Figure 7:
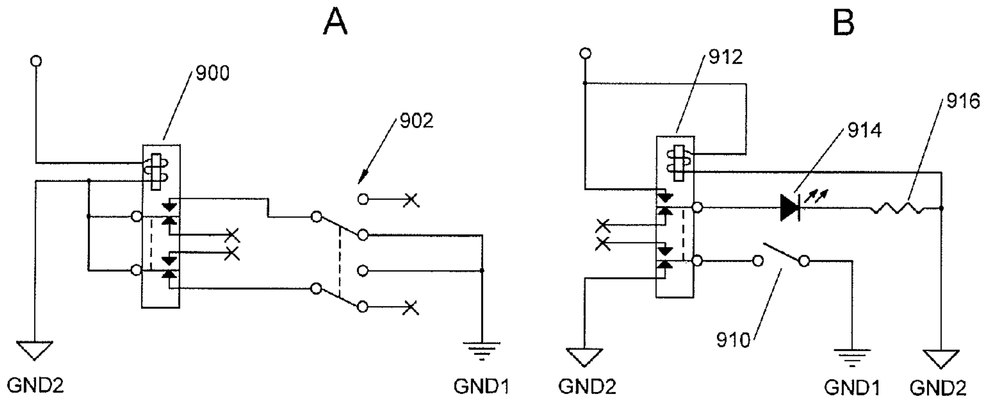
FIGS. 7A and 7B illustrate alternative switch configurations.

FIGS. 7A and 7B illustrate alternative switch configurations.

As shown in FIG. 7A, a relay 900 and a switch 902 are in control of the ground configuration simultaneously. A change in the position of the switch 902 or a change of the phantom power results in a change of the ground connection.

As shown in FIG. 7B, closing of a switch 910 causes the ground configuration to be dependent upon on the state of a relay 912. When the switch 910 is open, the ground connection is open and is not dependent upon the state of the relay 912. When the switch 910 is closed, the ground connection is dependent upon the state of the relay 912. An LED 914 indicates the presence of phantom power through a current limiting resistor 916.

Figure 8:
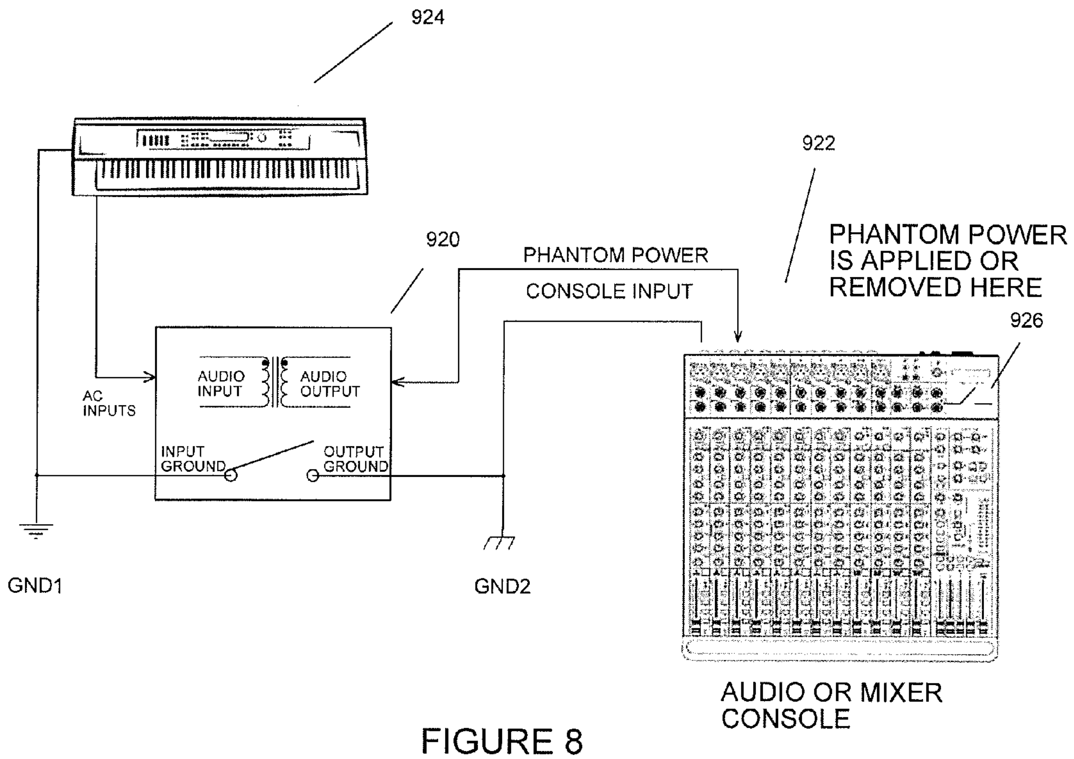
FIG. 8 shows connection of a direct box between a source and an audio console.

FIG. 8 shows the connection between a direct box 920, an audio or mixer console 922 that provides the phantom power to the output connector (such as 12 of FIG. 1) of the direct box 920 and receives the balanced output of the direct box 920, and a source 924 that provides the AC input to the input connector (such as 20 of FIG. 1) of the direct box 920. A switch 926 on the audio or mixer console 922 is operated by a user to control the supply of the phantom power to the direct box 920.

Figure 9:
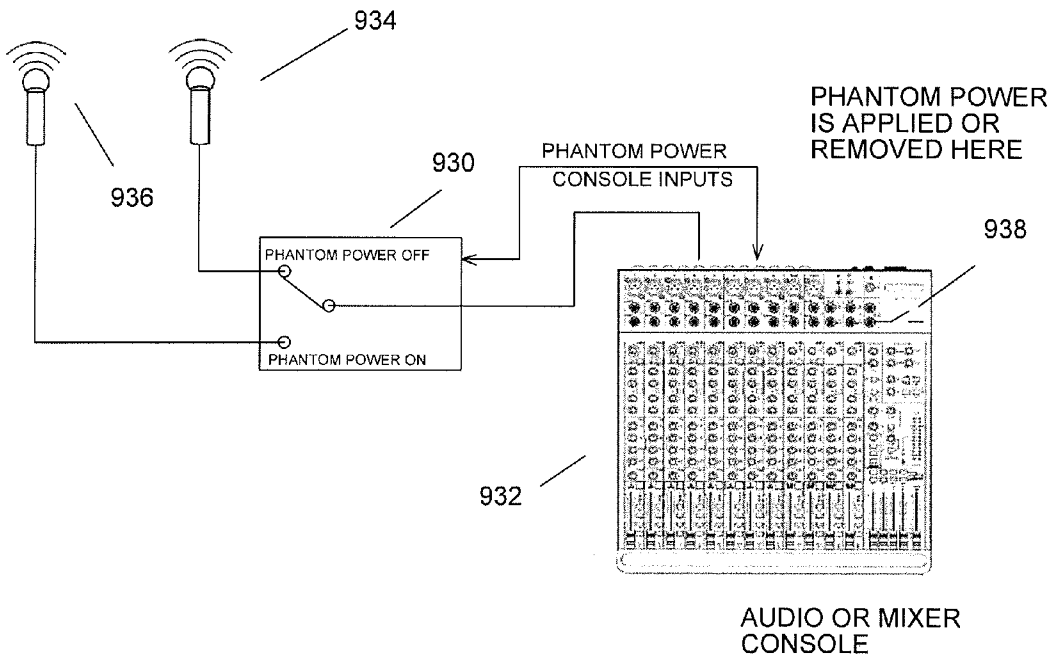
FIG. 9 shows connection of an A/B box between a source and an audio console; and, FIG. 10 illustrates another exemplary variation of FIG. 1.

FIG. 9 shows the connection between an A/B box 930, an audio console 932 that provides the phantom power to the output connector (such as 104 of FIG. 2) of the A/B box 930 and receives the balanced output of the A/B box 930, a first source 934 that provides a first AC input to one of the input connectors (such as 106 of FIG. 2) of the A/B box 930, and a second source 936 that provides a second AC input to another of the input connectors (such as 108 of FIG. 2) of the A/B box 930. A switch 938 on the audio or mixer console 932 is operated by a user to control the supply of the phantom power to the A/B box 930.

Figure 10:
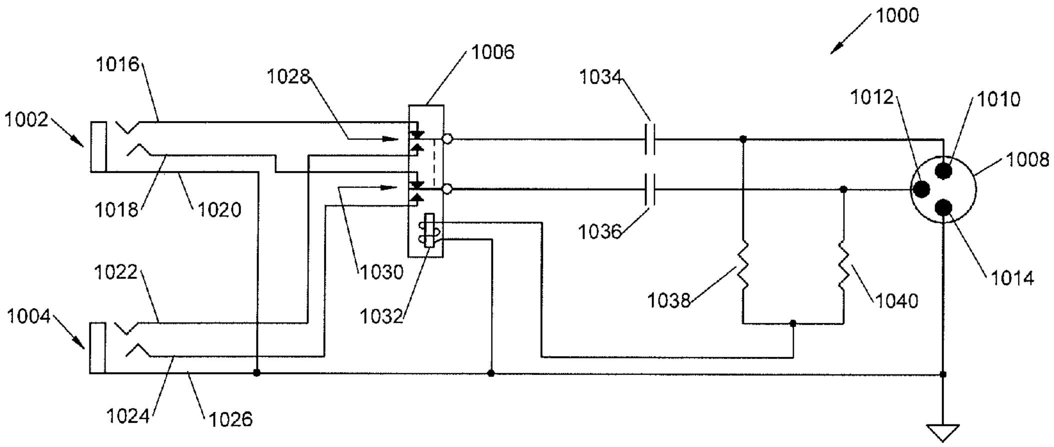

FIG. 10 shows an arrangement in which two capacitors are used to replace the transformers in FIGS. 1, 2, 3, and 6 to perform the function of blocking DC voltage and passing AC voltage. An A/B box 1000 selects one of two (or more) AC inputs 1002 or 1004 which is then routed to the one AC balanced output of the A/B box 1000. The selection is controlled by application of external phantom power on the balanced output of the A/B box 1000.

The A/B box 1000 includes a relay 1006, such as a double pole, double throw, 2-Form-C relay, that is used to connect an output connector 1008 to either of the two input connectors 1002 or 1004, depending on whether phantom power is applied. The connector 1008 is a three conductor connector, functioning as both the output of the balanced AC audio signal and the input for the phantom power. A conductor 1010 of the connector 1008 carries the non-inverted portion of the balanced output audio signal, and a conductor 1012 carries the inverted portion of the balanced output audio signal. Both of the conductors 1010 and 1012 of the connector 1008 function as positive DC poles for the phantom supply. As before, phantom power is commonly 12, 24, or 48 volts. A conductor 1014 of the connector 1008 provides a return path for the phantom power back to the audio console. The conductors 1010, 1012, and 1014, for example, may be pins.

Both of the connectors 1002 and 1004 are three conductor connectors functioning as inputs to the A/B box 1000. Conductors 1016 and 1018 of the connector 1002 carry the AC input signal from a first audio source. Conductors 1022 and 1024 of the connector 1004 carry the AC input signal from a second audio source. Conductors 1020 and 1026 of the connectors 1002 and 1004 serves as a common ground connection.

The conductors 1016 and 1018 of the connector 1002 and the conductors 1022 and 1024 of the connector 1004 are connected to capacitors 1034 and 1036 through switch contacts of the relay 1006. The conductor 1010 of the connector 1008 is connected to the capacitor 1034, and the conductor 1012 of the connector 1008 is connected to the capacitor 1036.

A first pole 1028 of the relay 1006 connects either the conductor 1016 of the connector 1002 or the conductor 1022 of the connector 1004 to the capacitor 1034. A second pole 1030 of the relay 1006 connects either the conductor 1018 of the connector 1002 or the conductor 1024 of the connector 1004 to the capacitor 1036. The capacitors 1034 and 1036 block the positive DC voltage on the phantom power on the conductors 1010 and 1012 of the connector 1008 from the first and second sources connected to the connectors 1002 and 1004, while allowing the AC components of the audio signal from the connectors 1002 and 1004 to pass through to the connector 1008.

Resistors 1038 and 1040 combine the phantom power currents on the conductors 1010 and 1012 of the connector 1008 while maintaining a load impedance on the balanced output of the A/B box 1000. The phantom power combined by the resistors 1038 and 1040 is fed to an electromagnetic coil 1032 of the relay 1006.

When phantom power is applied to the connector 1008 and then through the combining resistors 1038 and 1040 to the relay 1006, the coil 1032 is energized and the first and second poles 1028 and 1030 of the relay 1006 switch to connect only the conductors 1022 and 1024 of the connector 1004 to the capacitors 1034 and 1036. When the phantom power is off, the relay 1006 is de-energized and only the conductors 1016 and 1018 of the connector 1002 are connected to the capacitors 1034 and 1036 through the first and second poles 1028 and 1030 of the relay 1006. Accordingly, application of phantom power from the audio console to the connector 1008 operates the relay 1006 through the combining resistors 1038 and 1040 so as to switch the capacitors 1034 and 1036 between the connectors 1002 and 1004.

Thus, the capacitors 1034 and 1036 block the positive DC voltage phantom power on the conductors 1010 and 1012 of the connector 1008 from the first and second sources connected to the connectors 1002 and 1004, while allowing the AC components of the audio signal from the connectors 1002 and 1004 to pass through to the connector 1008.

Certain modifications of the present invention have been described above. Other modifications will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A device for performing a switching operation in response to an externally applied DC control signal from an external audio load, the device comprising:

an input connector that receives an input audio signal from an external audio source;

an output connector having a conductor that provides an audio output signal;

a DC isolator coupling to the input audio signal from the input connector, the DC isolator provides audio output signal to the conductor of the output connector, the DC isolator blocks the externally applied DC control signal from the input connector, the externally applied DC control signal switching between a first state and a second state; and a switch responsive to the externally applied DC control signal applied to the conductor of the output connector so as to perform the switching operation, the switch automatically switching to a first switch state upon the DC control signal switching to the first state and the switch automatically switching to a second switch state upon the DC control signal switching to the second state.

2. The device of claim 1, wherein the switch comprises a relay switch.

3. The device of claim 1, wherein the switch comprises a solid state switch.

4. The device of claim 1, wherein the switch comprises a control terminal and switched terminals, wherein the control terminal is connected to receive the externally applied DC control signal applied to the conductor of the output connector, and wherein the switched terminals are switched to perform the switching operation.

5. The device of claim 4, wherein the DC isolator comprises a transformer, wherein the output connector comprises first and second conductors, wherein the first and second conductors of the output connector are connected to a secondary of the transformer, wherein the first and second conductors of the output connector provide the audio output signal to the external audio load and receive the externally applied DC control signal, and wherein the switch further comprises a combiner that combines the externally applied DC control signal applied to the first and second conductors of the output connector and applies the combined externally applied DC control signal to the control terminal.

6. The device of claim 5, wherein the output connector comprises a third conductor, and wherein the third conductor of the output connector is connected to ground.

7. The device of claim 4, wherein the DC isolator comprises a transformer, wherein the output connector comprises first and second conductors, wherein the first and second conductors of the output connector are connected to a secondary of the transformer, wherein the first and second conductors of the output connector provide the audio output signal to the external audio load and receive the externally applied DC control signal, and wherein the control terminal of the switch is connected to a center tap of the secondary so as to receive externally applied DC control signal.

8. The device of claim 7, wherein the output connector comprises a third conductor, and wherein the third conductor of the output connector is connected to ground.

9. The device of claim 1, wherein the switch comprises a first switch, wherein the first switch is remotely controlled by the externally applied DC control signal to perform the switching operation, and wherein the device further comprises a second switch that is locally and manually controlled to perform the switching operation.

10. The device of claim 1, wherein the DC isolator comprises a transformer.

11. The device of claim 10, wherein the input connector comprises first and second input connectors, wherein the switch switches the first input connector but not the second input connector to a primary of the transformer in the presence of the externally applied DC control signal on the output connector, and wherein the switch switches the second input connector but not the first input connector to the primary of the transformer in the absence of the externally applied DC control signal on the output connector.

12. The device of claim 1, further comprising;

input and output grounds, wherein the switch connects the input and output grounds dependent upon one of the presence and absence of the externally applied DC control signal on the conductor of the output connector, and wherein the switch disconnects the input and output grounds dependent upon the other of the presence and absence of the externally applied DC control signal on the conductor of the output connector.

13. The device of claim 1, wherein the DC isolator comprises a capacitor.

14. The device of claim 1, wherein the DC isolator comprises first and second capacitors, wherein the input connector comprises first and second input connectors, wherein the switch switches the first input connector but not the second input connector to the first and second capacitors in the presence of the externally applied DC control signal on the output connector, and wherein the switch switches the second input connector but not the first input connector to the first and second capacitors in the absence of the externally applied DC control signal on the output connector.

15. A method of performing a switching operation in response to an externally applied DC control signal from an external audio load, the method comprising:

receiving an input audio signal from an external audio source;

receiving the externally applied DC control signal on a conductor of an output connector so as to control the switching operation, the externally applied DC control signal switching between a first state and a second state; and automatically performing the switching operation in response to the externally applied DC control signal received on the conductor of the output connector so as to connect the input audio signal to the output connector while isolating the externally applied DC control signal from an input connector receiving the input audio signal when the switching operation is in a first switching state, the switching operation automatically switching between the first switch state and a second switch state depending on the respective first and second states of the externally applied DC control signal.

16. The method of claim 15, wherein the step of performing of the switching operation comprises operating a relay switch.

17. The method of claim 15, wherein the step of performing of the switching operation comprises operating a solid state switch.

18. The method of claim 15, wherein the step of performing of the switching operation comprises providing the audio output signal to first and second conductors of the output connector, wherein the step of receiving of the externally applied DC control signal comprises receiving the externally applied DC control signal on the first and second conductors of the output connector, wherein the first and second conductors of the output connector provide the audio output signal to the external audio load, and wherein the step of performing of the switching operation further comprises:

combining the externally applied DC control signal received on the first and second conductors of the output connector; and performing the switching operation in response to the combined externally applied DC control signal.

19. The method of claim 18, wherein the output connector comprises a third conductor, and wherein the third conductor of the output connector is connected to ground.

20. The method of claim 15, wherein the step of performing the switching operation comprises providing the audio output signal to first and second conductors of the output connector, wherein the step of receiving the externally applied DC control signal comprises receiving the externally applied DC control signal on the first and second conductors of the output connector, wherein the first and second conductors of the output connector provide the audio output signal to the external audio load, and wherein the step of performing the switching operation further comprises:

connecting the input audio signal to an audio output signal through a transformer; and performing the switching operation in response to the externally applied DC control signal received through a center tap of the transformer.

21. The method of claim 20, wherein the output connector comprises a third conductor, and wherein the third conductor of the output connector is connected to ground.

22. The method of claim 15, wherein the step of performing the switching operation comprises:

performing a remotely controlled switching operation in response to the externally applied DC control signal; and performing a locally and manually controlled switching operation.

23. The method of claim 15, wherein the step of receiving an input audio signal from an external audio source comprises:

receiving a first input audio signal from a first external audio source; and receiving a second input audio signal from a second external audio source; and wherein the step of performing the switching operation comprises:

switching the first input audio signal but not the second input audio signal to the conductor of the output connector; and switching the second input audio signal but not the first input audio signal to the conductor of the output connector.

24. The method of claim 15, wherein the step of performing the switching operation comprises connecting input and output grounds together and disconnecting the input and output grounds.

25. The method of claim 15, wherein the step of performing the switching operation comprises connecting the input audio signal to the output connector through a transformer that isolates the externally applied DC control signal from the input connector receiving the input audio signal.

26. The method of claim 15, wherein the step of performing the switching operation comprises connecting the input audio signal to the output connector through a capacitor that isolates the externally applied DC control signal from the input connector receiving the input audio signal.

* * * * *